July 28, 1942.   F. L. JONES   2,290,911
GLASS BODY
Filed March 25, 1939

Frank L. Jones
INVENTOR
BY
ATTORNEYS

Patented July 28, 1942

2,290,911

UNITED STATES PATENT OFFICE 2,290,911

GLASS BODY

Frank L. Jones, Edgewood, Pa., assignor to Bausch & Lomb Optical Company, Rochester, N. Y., a corporation of New York Application March 25, 1939, Serial No. 264,136

1 Claim. (Cl. 49—92)

The present invention relates to glass bodies.

One of the objects of the present invention is to provide a glass article having predetermined optical properties and other predetermined surface properties. A further object is to provide a glass article having a body of one chemical composition and having its surface layer of a different chemical composition. These and other objects and advantages reside in certain novel features and characteristics as will hereinafter be more fully set forth and pointed out in the appended claim.

Referring to the drawing.

Figure 1:
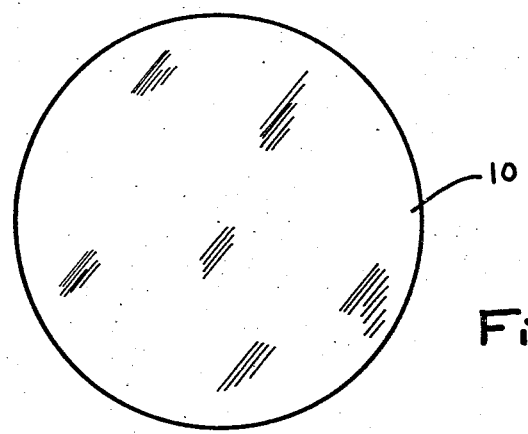
Fig. 1 is a face view of a lens made according to my invention.
Figure 2:
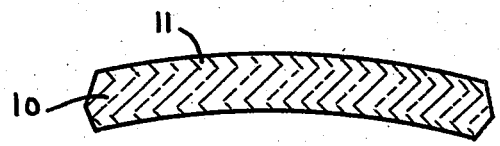
Fig. 2 is a sectional view thereof.

In the making of optical elements and systems, it is necessary to have glasses of different optical properties, that is, different indices of refraction and different reciprocal relative dispersions. The optical requirements in a general way determine the chemical composition of the glass. For example, when a glass of high index of refraction is required, it is usually necessary to have appreciable amounts of heavy metals such as lead and barium in the glass while lighter metals such as sodium and potassium can be used when a lower index of refraction is satisfactory.

Apart from the optical properties, however, other properties of the glass must be considered, and sometimes these other properties necessitate awkward and inefficient optical designs. For example, lead and barium glasses corrode and stain readily and are readily attacked by acids or moist air. For this reason the optical designer is sometimes compelled to rearrange optical systems so that the sensitive high index glass is protected by relatively inert low index glass.

According to the present invention, these difficulties may be avoided and glass may be chosen for its optical properties and later treated to obtain the surface properties necessary for its intended use.

In the drawing, the lens 10 is made of glass of the appropriate chemical composition to obtain the desired optical properties. For example, this lens may be composed of a lead or barium glass. Lead and barium are heavy metals and form oxides which render glass acid soluble, that is, susceptible to staining. In order to make this lens 10 stain-resistant, it is treated so as to substitute other metals for the lead or barium in the surface layer 11.

This substitution is accomplished in the following manner. The lens 10 is ground and polished to its desired final shape and a fused salt of a light metal such as sodium or potassium is placed on the surface of the lens. The lens and salt are heated to a temperature above the fusing point of the salt but below the softening point of the glass. The glass and salt are maintained within these temperature limits until the sodium or potassium from the salt has replaced some of the lead or barium from the glass. The lens is then cooled and the surplus salt washed off.

The resultant lens has a body of lead or barium glass while the surface layer, a few molecules thick, is a soda or potash glass with the stain-resisting properties of soda and potash glasses. Since the soda or potash glass surface layer has a lower index of refraction than the lead or barium body, this treatment reduces the surface reflection from the lens and increases its transmission sometimes as much as from one to three percent.

In the treatment of lead or barium glasses, low melting point salts of sodium or potassium such as sodium nitrate, sodium hydrogen sulfate, potassium nitrate and potassium hydrogen sulfate can be used. The time for the exchange of atoms between the fused salt and the glass surface is short, even at temperatures from 120° C. to 250° C. Various mixtures of salts can be used to lower the temperature of fusion and an increase of temperature at which the glass and salt are held increases the speed of the exchange.

The invention is not limited to the treatment of high index, easily stained glass with the salts of lighter metals. Soda-lime-silica and potash-lime-silica glasses may be similarly treated to raise the index of refraction of the surface layers. I have found that these glasses may be treated with fused chloride salts of lead, barium, tin, silver or the like. These lead, barium, tin or silver salts may be used alone or may be mixed with other salts to lower the fusion temperature of the bath.

Zinc salts such as zinc chloride can be used to treat the surface of either soda or potash glasses or the surface of lead or barium glasses. The treatment with the fused zinc salt changes the composition of the surface layers of the glass and hence changes the index of refraction of the surface layers. When the zinc replaces heavy metals such as lead or barium, the index of refraction is lowered and when the light alkali metals are replaced by zinc the index of refraction is raised.

Even some non-metallic salts are effective in displacing constituents of glass. Fused ammonium hydrogen sulfate lowers the index of refraction of the surface layers of a lead or barium glass and protects it to some small extent from corrosion.

This replacement of one constituent of the glass by another is limited to a surface layer of the glass a few molecules thick and hence the optical element should be ground and polished before treatment. The change of the surface composition does not materially affect the light deviating properties of the element but permits the optical designer to consider and specify the optical and surface properties of the element independently. In other words, a glass is selected having the required index of refraction and reciprocal relative dispersion and is then treated to obtain the desired surface properties.

From the foregoing, it will be apparent that I am able to attain the objects of my invention and provide an optical element having a body of one composition and a surface of another, different composition. Various modifications of technique and procedure can, of course, be made without departing from the spirit of my invention or the scope of the appended claim.

I claim:

In a glass body having a ground and polished surface and a composition comprising a silica oxide and a metallic oxide from that class of acid soluble glass forming oxides consisting of lead oxide and barium oxide, a substantially acid insoluble surface layer having a composition comprising said silica oxide of the body and an oxide wherein an alkaline element from the class of metallic alkaline constituents consisting of sodium, potassium and ammonium, replaces the metallic element of said acid soluble glass forming oxide.

FRANK L. JONES.